(12) United States Patent
Kwong et al.

(10) Patent No.: US 7,786,379 B1
(45) Date of Patent: Aug. 31, 2010

(54) METHOD FOR ATTACHING AN ELECTRICAL FIXTURE TO A JUNCTION BOX

(75) Inventors: Allan Kwong, Shatin (CN); Chen Xiao Chen, Zhongshan (CN)

(73) Assignee: Gardenia Industrial Limited, Kowloon (CN)

( * ) Notice: Subject to any disclaimer, the term of this patent is extended or adjusted under 35 U.S.C. 154(b) by 0 days.

(21) Appl. No.: 12/276,694

(22) Filed: Nov. 24, 2008

Related U.S. Application Data

(62) Division of application No. 11/500,045, filed on Aug. 7, 2006, now Pat. No. 7,456,357, which is a division of application No. 10/393,520, filed on Mar. 18, 2003, now Pat. No. 7,105,744.

(51) Int. Cl.
*H01H 9/02* (2006.01)

(52) U.S. Cl. .............................. 174/58; 174/50; 174/61; 174/63; 29/729; 248/906

(58) Field of Classification Search ................. 174/480, 174/481, 50, 53, 57, 66, 17 R, 135, 58, 61, 174/63; 220/3.2–3.9, 4.02, 3.34; 248/906, 248/343; 439/535; 52/39; 29/729, 592, 29/592.1
See application file for complete search history.

(56) References Cited

U.S. PATENT DOCUMENTS

| | | | |
|---|---|---|---|
| 1,155,350 A | 10/1915 | Gilson et al. |
| 1,843,054 A | 1/1932 | Weinstein |
| 2,494,428 A | 1/1950 | Buck |
| 2,623,091 A | 12/1952 | Rottenhouse |
| 2,921,114 A | 1/1960 | Keen |
| 3,037,110 A | 5/1962 | Williams |
| 3,638,170 A | 1/1972 | Clement et al. |
| 3,676,570 A | 7/1972 | Gabb |
| 3,798,584 A | 3/1974 | Person |
| 4,426,126 A | 1/1984 | De Vos et al. |
| 4,645,286 A | 2/1987 | Isban et al. |
| 4,645,289 A | 2/1987 | Isban |
| 4,861,273 A | 8/1989 | Wenman et al. |
| 4,929,187 A | 5/1990 | Hudson et al. |
| 4,952,157 A | 8/1990 | Hudson et al. |
| 4,979,081 A | 12/1990 | Leach et al. |
| 5,151,037 A | 9/1992 | Range et al. |

(Continued)

OTHER PUBLICATIONS

EasyLite Installation Instructions, 4 pgs.; Eurofase Lighting, Eurofase, Inc., 33 West Beaver Creek Road, Richmond Hill, Ontario, Canada L4B 1L8 (undated; for purposes of this statement, prior to Mar. 18, 2003).

*Primary Examiner*—Angel R Estrada
(74) *Attorney, Agent, or Firm*—Baker Donelson Bearman Caldwell & Berkowitz PC

(57) ABSTRACT

A mounting assembly for connecting a housing of an electrical fixture to an electrical junction box, in which a plate attached to the housing includes a locking member having an engager at a first end moveable relative to the plate between a first position and a second position. A locking post adapted for connecting to an electrical junction box includes a receiver for engaging the engager. The locking post secures the housing to the electrical junction box upon moving the locking member to the second position to engage the engager with the receiver of the locking post. A method of attaching a housing for an electrical fixture to an electrical junction box is disclosed.

9 Claims, 2 Drawing Sheets

U.S. PATENT DOCUMENTS

| | | |
|---|---|---|
| 5,151,038 A | 9/1992 | Range et al. |
| 5,154,509 A | 10/1992 | Wulfman et al. |
| 5,272,605 A | 12/1993 | Johnstone |
| 5,340,322 A | 8/1994 | Poulsen |
| 5,455,754 A | 10/1995 | Hoffer |
| 5,744,750 A | 4/1998 | Almond |
| 5,747,734 A | 5/1998 | Kozlowski |
| 5,833,358 A | 11/1998 | Patik |
| 5,900,583 A | 5/1999 | Russo |
| 5,939,671 A | 8/1999 | Gretz |
| 6,022,129 A | 2/2000 | Tang |
| 6,027,310 A | 2/2000 | Kerr, Jr. et al. |
| 6,146,191 A | 11/2000 | Kerr, Jr. et al. |
| 6,203,279 B1 | 3/2001 | Moody et al. |
| 6,244,733 B1 | 6/2001 | Fong et al. |
| 6,325,654 B1 | 12/2001 | Kerr, Jr. et al. |
| 6,464,524 B1 | 10/2002 | Kerr, Jr. et al. |
| 6,503,099 B2 | 1/2003 | Kerr, Jr. |
| 6,551,041 B2 | 4/2003 | Choate |
| 6,619,919 B2 | 9/2003 | Kerr, Jr. |
| 6,634,901 B2 | 10/2003 | Kerr, Jr. |
| 6,646,201 B1 | 11/2003 | Gretz |
| 6,653,558 B1 | 11/2003 | Bucher et al. |
| 6,676,442 B2 | 1/2004 | Kerr, Jr. |
| 6,682,303 B2 | 1/2004 | Wu |
| 6,761,469 B2 | 7/2004 | Wu |
| 6,761,540 B2 | 7/2004 | Tseng |
| 6,774,304 B1 | 8/2004 | Gretz |
| 6,799,982 B2 | 10/2004 | Kerr, Jr. |
| 6,806,426 B1 | 10/2004 | Gertz |
| 6,840,651 B2 | 1/2005 | Wu |
| 6,852,924 B2 | 2/2005 | Lesserd |
| 7,064,269 B2 * | 6/2006 | Smith .................. 174/50 |
| 7,105,744 B1 | 9/2006 | Kwong et al. |
| 7,117,591 B1 | 10/2006 | Gretz |
| 7,271,350 B2 | 9/2007 | Johnson |
| 7,456,357 B1 | 11/2008 | Kwong et al. |
| 2002/0111063 A1 | 8/2002 | Kerr |
| 2002/0163812 A1 | 11/2002 | Tseng |
| 2002/0163813 A1 | 11/2002 | Tseng |
| 2004/0085775 A1 | 5/2004 | Bucher et al. |

* cited by examiner

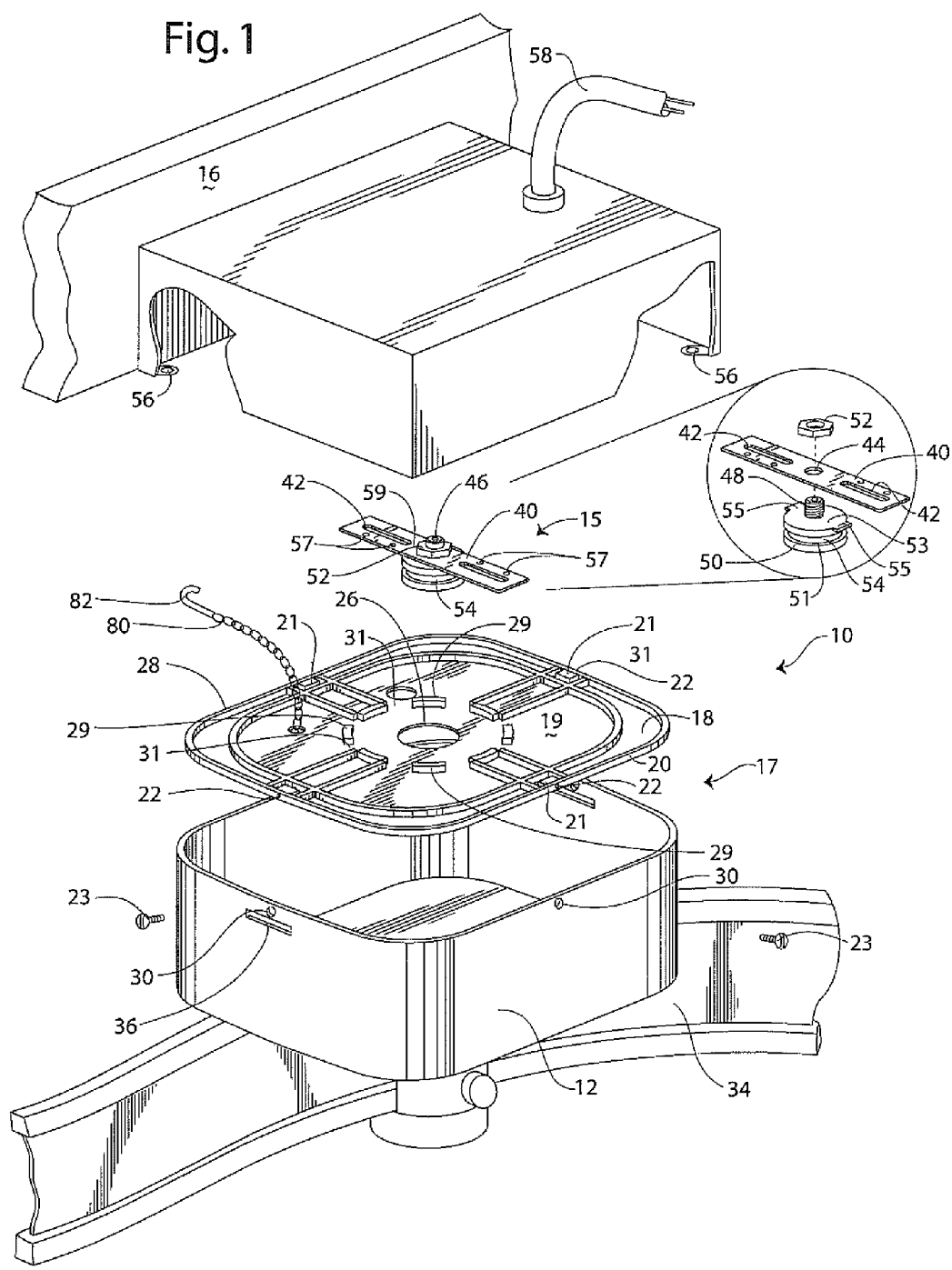

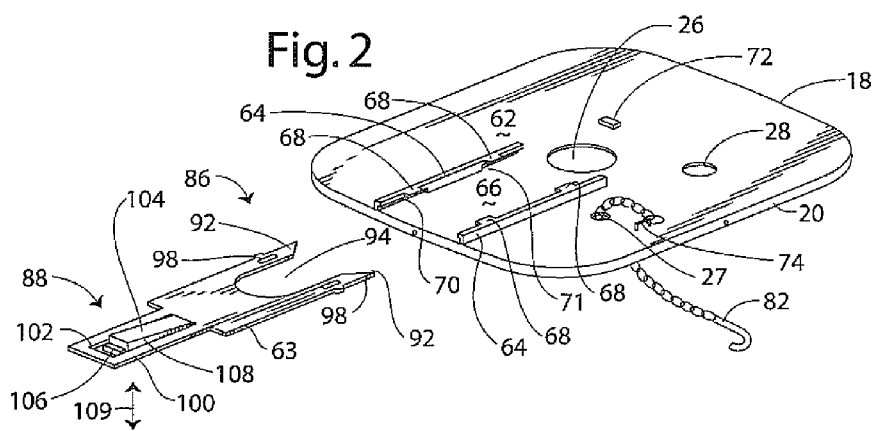
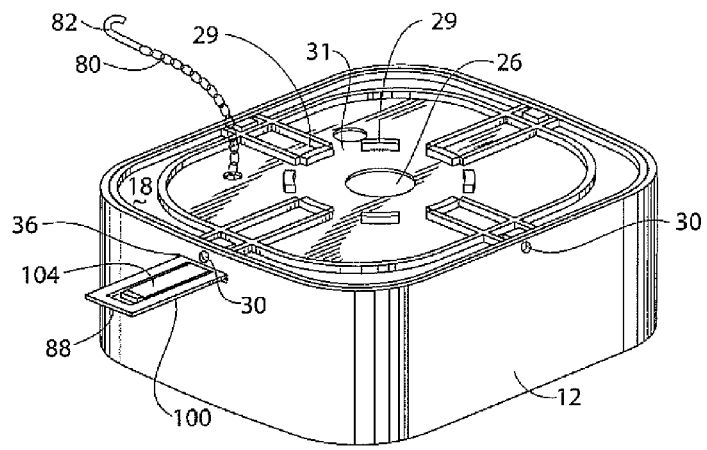
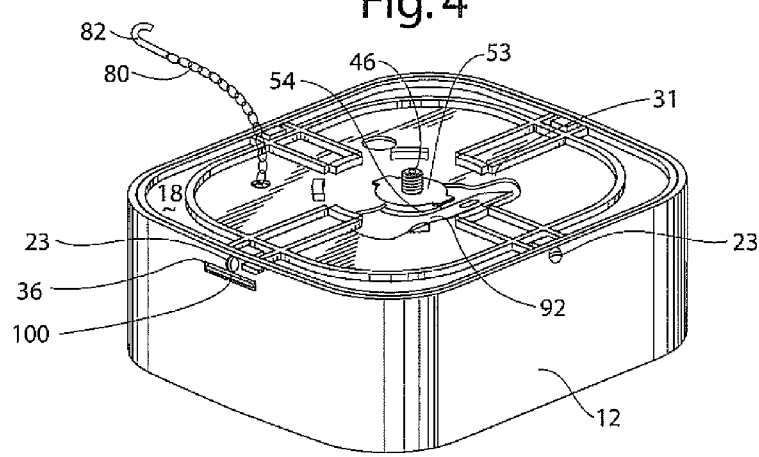

METHOD FOR ATTACHING AN ELECTRICAL FIXTURE TO A JUNCTION BOX

This application claims the benefit under 35 USC §120 as a divisional of co-pending U.S. patent application Ser. No. 11/500,045, filed Aug. 7, 2006, a divisional of U.S. patent application Ser. No. 10/393,520, filed Mar. 18, 2003, U.S. Pat. No. 7,105,744.

TECHNICAL FIELD

The present invention relates to electrical fixtures. More particularly, the present invention relates to mounting brackets for securing electrical fixtures to junction boxes.

BACKGROUND OF THE INVENTION

Electrical fixtures typically attach to junction boxes for supporting the fixtures and for providing enclosures for electrical wiring connections between an electric current supply and the fixture. Junction boxes used for lighting often have an open side and a cross member attaches with screws to ears of the junction box. A stem extends from the cross member. The stem extends through an opening in the fixture. A nut threads on the stem to secure the fixture to the stem and thus to the junction box. In other fixtures, spaced-apart openings in the fixture receive screws that threadingly engage openings in the cross member.

While this has been useful in connecting fixtures to junction boxes, the installation of the fixture raises problems. The structure of the fixture is limited by the need to provide access to the stem or the separate screws for connecting the fixture to the junction box. In some fixtures, a separate connection is required to secure the fixture to a transition member that rigidly connects to the junction box or the cross member. It also takes some time and skill to properly align the fixture to the junction box and tighten the nut or the screws that secure the fixture to the junction box. Wiring connections between the fixture and the junction box also presents problems.

Accordingly, there is a need in the art for a mounting bracket for securing electrical fixtures to junction boxes. It is to such that the present invention is directed.

BRIEF SUMMARY OF THE INVENTION

The present invention solves the above-described problems in the prior art by providing a method of attaching a housing for an electrical fixture to an electrical junction box, comprising the steps of:
  (a) attaching a cross member to an electrical junction box, the cross member including a locking post extending in a first direction from the cross member;
  (b) moving a housing of an electrical fixture to receive the locking post in an opening of the housing; and
  (c) moving a locking member that defines an engager at a first end through a slot in a side wall of the housing relative to the housing from a first position where the locking post is received in the opening to a second position to engage the locking member to the locking post;
whereby the locking member engaged with the locking post secures the housing to the electrical junction box.

Objects, advantages and features of the present invention will become apparent from a reading of the following detailed description of the invention and claims in view of the appended drawings.

BRIEF DESCRIPTION OF THE DRAWINGS

FIG. 1 illustrates in perspective view a mounting bracket according to the present invention for securing an electrical fixture to a junction box.

FIG. 2 illustrates in perspective view an opposing side of a plate of the mounting bracket illustrated in FIG. 1.

FIG. 3 illustrates in detailed perspective view a locking member in a first position slidably engaged with the plate illustrated in FIG. 2.

FIG. 4 illustrates in detailed perspective cut-away view the locking member of the mounting bracket in a second position engaged to a locking post for securing the electrical fixture to the junction box.

DETAILED DESCRIPTION

Referring now in more detail to the drawings, in which like numerals indicate like parts throughout the several views, FIG. 1 illustrates in perspective view a mounting bracket 10 according to the present invention for securing a housing 12 of an electrical fixture to a junction box 14 attached to a joist 16 illustrated in a ceiling portion of a room. The mounting bracket 10 includes an upper assembly 15 and a lower hanging assembly 17.

The lower hanging assembly 17 includes a plate 18 configured for being received by the housing 12. A wall or flange 20 extends from an edge of a first side 19 of the plate 18. The flange 20 includes portions 21 that each define an opening 22. In the illustrated embodiment, the portions 21 are thickened relative to the flange 20. The openings 22 are threaded for receiving screws 23. The first side 19 of the plate includes support ribs 24 generally for rigidity. The plate 18 defines an opening 26 which in the illustrated embodiment is positioned central to the plate 18. A plurality of arcuate flanges 29 extend from the plate 18 about the opening 26. The flanges 29 are spaced-apart to define gaps 31, for a purpose discussed below. The plate 18 further defines a second opening 28 and a third opening 27 that are each offset from the opening 26, for purposes discussed below.

The housing 12 is configured for receiving the plate 18. An edge portion of the housing 18 defines openings 30 that align with the openings 22 in the flange 20 when the plate 18 connects to the housing 12. The screws 23 pass through the respective aligned openings 30, 22 to secure the plate 18 to the housing 12. The housing 12 encloses electrical components of an electrical fixture to be attached to the electrical junction box. In the illustrated embodiment, the housing 12 encloses a transformer (not illustrated) that provides electrical current to a ribbon-track lighting fixture generally 34. An edge portion of the housing 12 defines a slot 36. In the illustrated embodiment, one of the openings 30 is between the slot 36 and an edge of the housing 12.

The upper assembly 15 includes a cross-member 40. The cross-member 40 defines opposing slots 42 and a central opening 44, as illustrated in detailed break-away view. A locking post 46 attaches to the cross-member 40. The locking post 46 defines a first threaded end 48 and an opposing flanged end 50. The threaded end 48 extends through the opening 44 and engages a nut 52 to secure the locking post 46 to the cross member 40. The flanged end 50 defines a recessed groove 54 extending about the exterior of the locking post 46. The groove 54 is defined intermediate a distal flange 51 and a support flange 53. The distal flange 51 is sized for being received in the opening 26 of the plate 18. The support flange 53 extends radially outwardly to an extent that is greater than the edge of the distal flange 51. A pair of opposing arms 55 project radially from the support flange and are sized for being received in the gaps 31 defined by the arcuate flanges 29 on the plate 18. The cross member 40 defines opposing openings 57 as well as an opening 59 for a conventional ground screw. A portion 49 of the locking post 46 adjacent the support flange 53 defines opposing flat faces for receiving a tool for holding the locking post 46 while tightening the nut 52 to secure the locking post to the cross member 40.

The electrical junction box 14 is conventional and mounts with fasteners (not illustrated) to the joist 16. As illustrated in cut-away view, the junction box 14 includes opposing ears 56 that define openings. Screws 58 extend through the openings 57 (or the slots 42) in the cross member 40 as well as through the openings in the ears 56 to secure the cross-member 40 to the electrical junction box 14. The electrical junction box 14 defines knock-outs or openings 60 for passage of a conduit 58 carrying electrical wires into the junction box 14 for connecting and supplying electrical current to an electrical fixture, such as the fixture 34.

FIG. 2 illustrates in perspective view an opposing side 62 of the plate 18 with a locking member 63 exploded away. A pair of flanges 64 extend from either side of the opening 26 to define a track 66. The flanges 64 each have a pair of spaced-apart tabs 68 that extend towards the tabs 68 on the opposing flange 64. Recesses 70, 71 are defined in the inward face surfaces of the opposing flanges 64. The recesses 70, 71 in the illustrated embodiment are substantially in alignment with the tabs 68. A stop 72 extends from the plate 18 beyond a distal extent of at least one of the flanges 64 and on an opposing side of the opening 26. The stop 72 is disposed generally transverse to the track 66. A open loop 74 extends from the plate 18 adjacent the opening 27. A ring 78 attaches a chain 80 to the loop 74. The chain 80 extends through the opening 27. A hook 82 attaches to a distal end of the chain 80.

The lower hanging assembly 15 further includes a locking member 63 adapted to be received on the track 66 for sliding movement guided by the opposing flanges 64. The locking member 63 defines an engager 86 at a first distal end and a locking device 88 at an opposing distal end. The engager 86 includes a pair of spaced-apart arms 92 that extend longitudinally. The arms 92 define an arcuate slot 94 in the distal portion of the locking member 63. In the illustrated embodiment, the inner edges of the arms 92 that define the slot 94 are arcuate to define at least a portion of a cylinder for engaging the groove 54 in the locking post 46. A projection 98 extends from an outer edge of each arm 92 in a distal portion thereof. The projection 98 is detachably receivable in respective recesses 70, 71, as discussed below.

The locking device 88 includes a U-shaped handle or frame 100 that defines an opening 102. The frame 100 extends from a main body portion of the locking device 88. An arm 104 attaches at a first end to the main body portion as a cantilever inwardly of the frame 100. The arm 104 tapers from a narrow thickness at the connection with the main body portion to a greater thickness in an intermediate portion of the arm. The arm 104 terminates in a tab 106 that extends longitudinally from a stop wall 108 at the intermediate portion of the arm towards an outer extent of the frame 100. The arm 104 moves relative to the frame 100, as indicated by the arrow 109, as discussed below.

FIG. 3 illustrates a perspective partial view of the locking member 63 slidably received by the plate 18 with the locking device 88 including the frame 100 and arm 104 extending from the slot 36 of the housing 12. The locking member 63 is disposed in a first position for connecting the housing 12 to the junction box 14, as discussed below.

FIG. 4 illustrates in detailed perspective cut-away view the locking member 63 of the mounting bracket 10 in a second position engaged to the locking post 46 for securing the housing 12 to the junction box 14. The arms 92 of the engager 86 extend beyond the opening 26 and the edges of the arms are received in the groove 54 of the locking post 46. The support flange 53 (shown in partial cut-away) seats on the plate surface 19 about the opening while the distal flange 51 is received within the opening 26.

The mounting bracket 10 of the present invention secures the housing 12 to the junction box 14. With respect to FIG. 2, the lower hanging assembly 15 assembles with the track 66 slidingly receiving the locking member 63 between the flanges 64. The tabs 68 hold the locking member 63 in the track 66 and prevent the locking member from movement outside a plane relatively parallel to and in close proximity with the plate 18. The recesses 70, 71 receive the projections 98 as detents during longitudinal movement of the locking member 63 relative to the plate as guided by the flanges 64.

With reference to FIGS. 1 and 3, the plate 18 is inverted for being received in the open end of the housing 12. The electrical wires from the electrical device in the housing 12 (in the illustrated embodiment, a transformer) thread from the second side 62 of the plate through the opening 28 to the first side 19 of the plate. The chain 80 passes through the opening 27 and attaches with the ring 78 to the loop 74. The locking device 88 of the locking member 63 inserts through the slot 36. The screws 23 thread through the openings 30 in the housing 12 and the aligned openings 22 in the plate 18 to secure the plate 18 to the housing 12.

With reference to FIG. 1, the mounting bracket 10 is used to support the housing 12 from the electrical junction box 14. The cross member 40 with the locking post 46 attaches to the electrical junction box 14. This is accomplished by passing screws through the holes 57 in the cross member 40 and into the openings in the ears 56 of the junction box 14. The flanged end 50 of the locking post 46 extends downwardly from the junction box 14 in the ceiling.

The housing 12 closed by the plate 18 is then attachable to the cross member 40 and thereby to the electrical junction box 14. First, the hook 82 attaches to the cross member 40, such as by engaging one of the slots 42. The chain 80 suspends the lower hanging assembly 15 including the housing 12 from the cross member 40. The electric wires extending through the opening 28, such as those associated with the transformer, are then wired to the electrical wires 58 extending from the junction box 14. With the housing 12 suspended by the chain 80, the installer readily connects the electrical wires without having to hold the housing 12.

Second, the hook 82 is disengaged from the cross member 40 while holding the housing 12. It is to be appreciated that the chain 80 and its function of suspending the housing 12 facilitates wiring and installation, but is not a component or needed element of the mounting bracket 10.

Being held, the housing 12 is then raised to a position generally below the cross member 40. As illustrated in FIGS. 3 and 4, the opening 26 is aligned with the locking post 46 depending from the cross member 40. The flanged end 50 of the locking post 46 inserts into the plate 18 through the central opening 26. The distal flange 51 fits into the opening 26. The arms 55 align with and are received in opposing gaps 31 between the arcuate flanges 29. The support flange 53 seats against the first side 19 of the plate 18. The arms 55 in the gaps 31 prevent the locking post 46 from rotating relative to the plate 18.

The plate 18 is then secured to the cross member 40. With reference to FIGS. 3 and 4, this is accomplished by moving the locking member 63 from its first position (FIG. 3) with the locking device 88 outwardly of the housing 12 to a second position (FIG. 4) with only a tip portion of the locking device extending from the housing. The locking member 63 slidingly moves along the track 66 guided by the flanges 66 and the tabs 68. This sliding movement causes the arms 92 to move into the groove 54 in the locking post 46. The projections 98 detach from the detent recesses 71 as the locking member 63 moves longitudinally towards the opening 26. The projections 98 contact distal ends of the flanges 64. The groove 54 of the locking post 46 receives the arcuate portion of the slot 94 in the engager 86 and thereby the arms 92 engage the locking member 63 to the locking post 46. This secures the housing 12 to the cross member 40 and thus to the electrical junction box 14.

As indicated above, the arm 104 moves 109 relative to the frame 100 as the locking device 88 moves longitudinally through the slot 36. The edge of the slot bears on the sloped surface of the arm and causes the arm 104 to move 109 in within the frame 100. Once the stop wall 108 clears the wall of the housing 12 by continued longitudinal movement of the locking member 63, the arm 104 moves in an opposite direction. The stop wall 108 then bears against an inner wall of the housing 12. The tab 106 and a tip portion of the frame 100 remain extending out of the slot 36. However, the stop wall 108 prevents the locking member 63 from independent opposing longitudinal movement out of engagement with the locking post 46. As explained above, simultaneous with longitudinal movement of the locking member 63, the arms 92 move into the groove 54 of the flanged end 50 of the locking post 46. The locking post 46 thereby communicates the loading of the housing 12 to the cross member 40 and thus to the electrical junction box 14. It is to be appreciated that the stop 72 prevents the locking member 63 from further movement.

The housing 12 may however be removed if necessary. This is accomplished by disengaging the mounting bracket 10 from the junction box 14. First, the arm 104 is moved relative to the frame 100 until the distal edge of the stop wall 108 is disposed fully within the opening 102 defined by the frame 100. This is accomplished by pushing the tab 108, for example, with a flat blade device, such a screw driver. Pushing on the tab 108 causes the arm 104 to move and bring the distal edge of the tapered portion within the opening of the frame 100. While the housing 12 is being held, the locking member 80 is then pulled outwardly away from the wall of the housing through the slot 36. The face of the sloped portion of the arm 104 slides in contact with an edge of the slot 36. As the locking member 80 moves outwardly, the arms 92 retract relative to the groove 54 and thereby disengage the slot 94 from the locking post 46. The hook 82 is engaged to the cross member 40, and the hosing allowed to suspend by the chain 80. The electrical wires are then disconnected. The hook 82 is released from the cross member 40 and the housing 12 removed.

This specification has described the present invention that provides the mounting bracket for securing electrical fixtures to junction boxes, which mounting bracket readily attaches and detaches while holding the electrical fixture engaged to the junction box. It is to be understood, however, that numerous changes and variations may be made in the construction of the present wipe pad within the spirit and scope of the present invention, and that modifications and changes may be made therein without departing from the scope thereof as set forth in the appended claims.

What is claimed is:

1. A method of attaching a housing for an electrical fixture to an electrical junction box, comprising the steps of:
    (a) attaching a cross member to an electrical junction box, the cross member including a locking post extending in a first direction from the cross member;
    (b) moving a housing of an electrical fixture to receive the locking post in an opening of the housing; and
    (c) moving a locking member that defines an engager at a first end through a slot in a side wall of the housing relative to the housing from a first position where the locking post is received in the opening to a second position to engage the locking member to the locking post;
    whereby the locking member engaged with the locking post secures the housing to the electrical junction box.

2. The method as recited in claim 1, wherein prior to step (b) suspending the housing relative to the electrical junction box and making electrical connections.

3. The method as recited in claim 1, wherein the step (c) comprises moving the locking member longitudinally guided by opposing flanges extending from a portion of the housing.

4. The method as recited in claim 1, wherein step (c) further comprises moving the locking member through a slot in a wall of the housing; and further comprising the steps of positioning a locking tab for passing through the slot substantially co-planar with the locking member; and releasing the locking tab for contacting a portion of the wall of the housing to restrict reverse longitudinal movement of the locking member through the slot.

5. The method as recited in claim 1, further comprising stopping the longitudinal movement of the locking member upon contact with a stop.

6. The method as recited in claim 1, wherein step (c) further comprises the step of receiving opposing projections on distal end portions of spaced-apart arms extending from the locking member into recesses in the locking post.

7. The method as recited in claim 1, further comprising the step of:
    (d) moving a cantilevered sloped arm attached to a portion of the locking member opposing the engager from an extended position to a retracted position as the portion moves through the slot; and
    (e) releasing the sloped arm to the extended position to lock the locking member to the housing,
    whereby the locking member is restricted from opposing longitudinal movement relative to the housing.

8. The method as recited in claim 7, further comprising with the housing attached to the cross arm, the step of moving the cantilevered sloped arm from the extended position to the retracted position for sliding the locking member in an opposing direction whereby the engager releases from the locking post as the locking member moves laterally through the slot away from the housing.

9. The method as recited in claim 1, wherein step (c) moving the engager comprises moving a pair of spaced-apart arms extending longitudinally from the first end of the locking member which arms defining a slot therebetween; and wherein the locking post defines a recessed groove, whereby the arms are slidably received in the groove upon moving the locking member to the second position.

* * * * *